April 11, 1950  S. S. FIERKE ET AL  2,503,717

PHOTOGRAPHIC FILTER AND ANTIHALATION LAYERS

Filed July 6, 1945

SCHEURING S. FIERKE
RALPH K. BARCLAY
*INVENTORS*

BY
*ATTORNEYS*

Patented Apr. 11, 1950

2,503,717

UNITED STATES PATENT OFFICE 2,503,717

PHOTOGRAPHIC FILTER AND ANTIHALATION LAYERS

Scheuring S. Fierke and Ralph K. Barclay, Rochester, N. Y., assignors to Eastman Kodak Company, Rochester, N. Y., a corporation of New Jersey Application July 6, 1945, Serial No. 603,498

9 Claims. (Cl. 95—8)

This invention relates to light-absorbing photographic layers and particularly to filter and anti-halation layers for photographic film.

In the preparation of sensitive photographic elements, it is frequently desirable to incorporate one or more layers of colloidal material which contain dyes or other coloring materials. These layers may fulfill any of a number of purposes such as the reduction of halation, filter certain undesirable rays from the exposing light, either upon direct exposure in a camera or for re-exposure in a reversal process. However, dyes for these purposes frequently are not sufficiently insoluble to remain in the gelatin layer in which they are incorporated, particularly in the multi-layer coatings used in color photography. If the dyes are insoluble enough to remain in the gelatin layer in which they are incorporated, it is frequently difficult to remove them in the usual photographic processing baths.

It is therefore an object of the present invention to provide a light-sensitive photographic material having a filter or anti-halation layer of gelatin colored with a dye which is insoluble in the gelatin and which may be removed during photographic processing. A further object is to provide a novel light-absorbing layer for photographic film and other photographic elements. Other objects will appear from the following description of our invention.

These objects are accomplished by incorporating an insoluble metallic salt of a 3-carboxy-5-pyrazolone azo dye in a gelatin layer of a photographic element.

Figure 1:
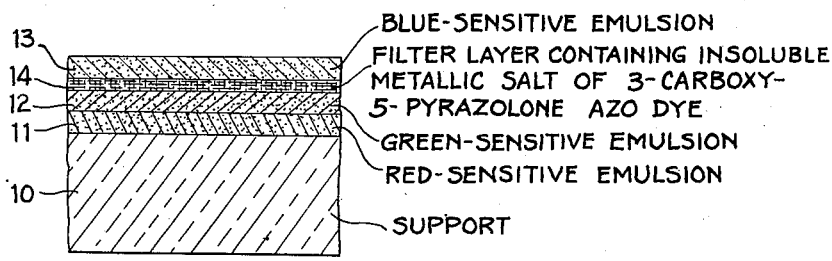
Figure 2:
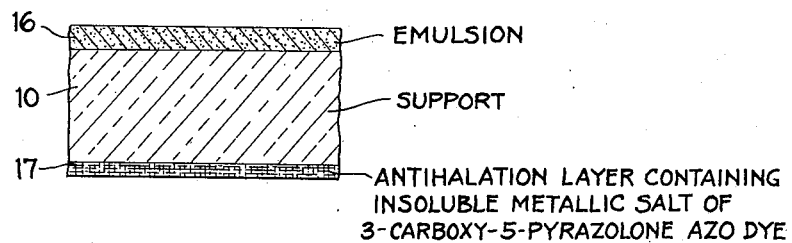

In the accompanying drawing, Fig. 1 is a sectional view of a multi-layer photographic element having an intermediate filter layer made according to our invention and Fig. 2 is a sectional view of a photographic element having an anti-halation layer made according to our invention.

The dyes which we propose to use are the insoluble metallic salts of 3-carboxy-5-pyrazolone azo dyes, having the following general formula:

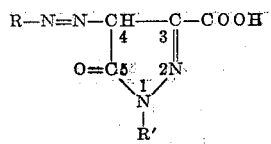

in which R is an aryl radical and R' is hydrogen or an aryl radical and the molecule contains not more than two salt-forming groups.

The metals used for the formation of the insoluble salts of these dyes may be the alkaline earth metals, calcium, barium, magnesium and strontium, or other metals such as lead, bismuth, cadmium, silver, tin (stannous), copper (cupric), iron (ferrous), nickel (nickelous), cobalt (cobaltous), aluminum, titanium, zirconium and zinc. When salts of the 3-carboxy-5-pyrazolone azo dyes are formed with these metals, the metal ion replaces the hydrogen of the carboxylic acid group and the resulting compounds are insoluble in gelatin and can be used to form useful light-absorbing layers for photographic materials.

The following dyes may be used to form the insoluble metallic salts according to our invention:

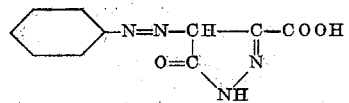

4-(phenylazo)-5-pyrazolone-3-carboxylic acid

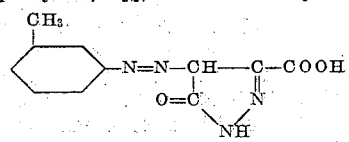

4-(3'-methylphenylazo)-5-pyrazolone-3-carboxylic acid

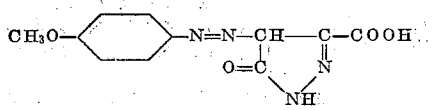

4-(4'-methoxyphenylazo)-5-pyrazolone-3-carboxylic acid

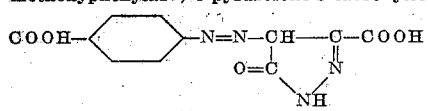

4-(4'-carboxyphenylazo)-5-pyrazolone-3-carboxylic acid

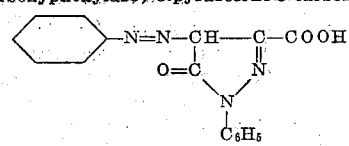

1-phenyl-4-(phenylazo)-5-pyrazolone-3-carboxylic acid

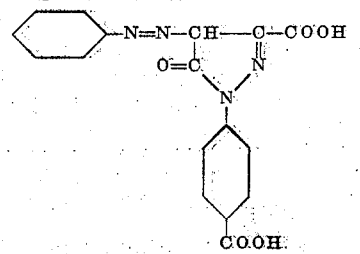

1-(p-carboxyphenyl)-4-phenylazo-5-pyrazolone-3-carboxylic acid

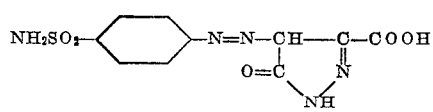

4-(4'-aminosulfonylphenylazo)-5-pyrazolone-3-carboxylic acid

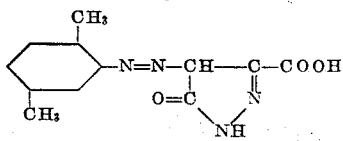

4-(2',5'-dimethylphenylazo)-5-pyrazolone-3-carboxylic acid

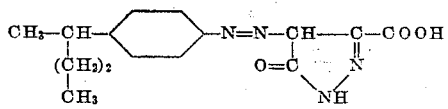

4-4'-sec. amyl phenylazo-5-pyrazolone-3-carboxylic acid

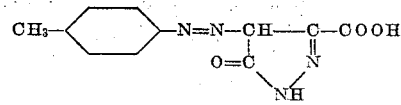

4-(4'-methylphenylazo)-5-pyrazolone-3-carboxylic acid

The following example illustrates the method of incorporating an insoluble metallic salt of a 3-carboxy-5-pyrazolone azo dye in gelatin according to our invention and coating a filter layer.

Example 1.0 gram of 4-(phenylazo)-5-pyrazolone-3-carboxylic acid is dissolved in 2 cc. of 20% sodium hydroxide and 35 cc. of water, and added to 200 cc. of 5% deashed gelatin. To this solution is added the normal equivalent amount, 0.38 g., of calcium acetate (or any soluble salt of the above metals) dissolved in 5 to 10 cc. of water. The pH of the resulting solution is adjusted to 5.5 with dilute acetic acid. The gel is then set, shredded, and washed one hour in running hardened water. The gel is then drained, melted and coated.

The insoluble metallic salts of azo dyes formed according to our invention are generally yellow to orange dyes. For example, the calcium salt of 4-(phenylazo)-5-pyrazolone-3-carboxylic acid is yellow, the barium, magnesium, bismuth and cadmium salts are orange, and the lead, calcium, magnesium, strontium, silver, ferrous and cadmium salts of 4-(3' methyl phenylazo)-5-pyrazolone-3-carboxylic acid are orange.

Our invention will be further illustrated by reference to the accompanying drawing. As shown therein, Fig. 1 is a sectional view of a multilayer film in which the support 10 of any suitable material such as cellulose acetate or paper is coated with gelatino-silver halide emulsion layers 11, 12 and 13, sensitive, respectively, to the red, green and blue regions of the spectrum. The layer 14 is a gelatin filter layer containing an insoluble metallic salt of a 3-carboxy-5-pyrazolone azo dye according to our invention.

Fig. 2 illustrates another modification of our invention according to which the support 10 is coated on one side with emulsion layer 16 and on the opposite side with gelatin layer 17 containing an insoluble metallic salt of a 3-carboxy-5-pyrazolone azo dye.

The dyes of our invention are removed from the photographic layer in the alkaline photographic developer, with the formation of the sodium salt of the dye.

It will be understood that our invention is to be taken as limited only by the scope of the appended claims.

We claim:

1. A photographic element comprising a support having thereon a light-sensitive silver halide emulsion layer and a light-absorbing layer comprising gelatin containing an insoluble metallic salt of the carboxylic acid group of a 3-carboxy-5-pyrazolone azo dye, said light-absorbing layer being positioned to absorb part of the light rays passing to said light-sensitive layer.

2. A photographic element comprising a support having in succession thereon a light-sensitive silver halide emulsion layer and a gelatin filter layer containing an insoluble metallic salt of the carboxylic acid group of a 3-carboxy-5-pyrazolone azo dye.

3. A photographic element comprising a support having in succession thereon a light-sensitive silver halide emulsion layer and a gelatin filter layer containing an insoluble metallic salt of the carboxylic acid group of a 3-carboxy-4-arylazo-5-pyrazolone dye.

4. A photographic element comprising a support having in succession thereon a light-sensitive silver halide emulsion layer and a gelatin filter layer containing an insoluble metallic salt of the carboxylic acid group of a 3-carboxy-4-phenylazo-5-pyrazolone azo dye.

5. A photographic element comprising a support having in succession thereon a light-sensitive silver halide emulsion layer and a gelatin filter layer containing an insoluble metallic salt of the carboxylic acid group of 4-phenylazo-5-pyrazolone-3-carboxylic acid.

6. A photographic element comprising a support having in succession thereon a light-sensitive silver halide emulsion layer and a gelatin filter layer containing an insoluble alkaline earth metal salt of the carboxylic acid group of a 3-carboxy-5-pyrazolone azo dye.

7. A photographic element comprising a support having in succession thereon a light-sensitive silver halide emulsion layer and a gelatin filter layer containing an insoluble alkaline earth metal salt of the carboxylic acid group of a 3-carboxy-4-arylazo-5-pyrazolone.

8. A photographic element comprising a support having in succession thereon a light-sensitive silver halide emulsion layer and a gelatin filter layer containing an insoluble calcium salt of the carboxylic acid group of a 3-carboxy-5-pyrazolone azo dye.

9. A photographic element comprising a support having in succession thereon a light-sensitive silver halide emulsion layer and a gelatin filter layer containing an insoluble calcium salt of the carboxylic acid group of a 3-carboxy-4-arylazo-5-pyrazolone.

SCHEURING S. FIERKE.
RALPH K. BARCLAY.

REFERENCES CITED

The following references are of record in the file of this patent:

UNITED STATES PATENTS

| Number | Name | Date |
|---|---|---|
| 1,879,537 | Schneider | Sept. 27, 1932 |
| 1,912,797 | Schneider | June 6, 1933 |

FOREIGN PATENTS

| Number | Country | Date |
|---|---|---|
| 524,558 | Great Britain | Aug. 8, 1940 |